(12) United States Patent
Kronlund et al.

(10) Patent No.: US 6,755,575 B2
(45) Date of Patent: Jun. 29, 2004

(54) SELF POWERED DATA COMMUNICATION OPTICAL FIBER CABLE EXTENDER

(75) Inventors: Bertil Kronlund, Varmdo (SE); Claus Johansson, Stockholm (SE)

(73) Assignee: Zarlink Semiconductor AB, Jarfalla (SE)

( * ) Notice: Subject to any disclaimer, the term of this patent is extended or adjusted under 35 U.S.C. 154(b) by 327 days.

(21) Appl. No.: 09/903,801

(22) Filed: Jul. 12, 2001

(65) Prior Publication Data

US 2002/0044746 A1 Apr. 18, 2002

(51) Int. Cl.$^7$ ................................................. G02B 6/38
(52) U.S. Cl. ......................................................... 385/73
(58) Field of Search ............................. 385/24, 53, 75, 385/88, 89, 92, 100, 101, 114, 73

(56) References Cited

U.S. PATENT DOCUMENTS

| | | | |
|---|---|---|---|
| 5,258,868 A | * 11/1993 | Jensen et al. | 398/162 |
| 5,345,527 A | 9/1994 | Lebby et al. | |
| 5,418,360 A | * 5/1995 | Sokolowska et al. | 250/227.12 |
| 6,466,718 B1 | * 10/2002 | Linnell | 385/100 |
| 6,607,307 B2 | * 8/2003 | Gilliland et al. | 385/88 |

FOREIGN PATENT DOCUMENTS

| | | |
|---|---|---|
| DE | 35 37 432 A1 | 10/1985 |
| EP | 0 437 161 A2 | 7/1991 |

* cited by examiner

*Primary Examiner*—Lynn Feild
*Assistant Examiner*—Thanh-Tam Le
(74) *Attorney, Agent, or Firm*—Lawrence E. Laubscher, Jr.

(57) ABSTRACT

An extender for an electrical data bus including a power line and signal lines has first and second electrical connectors for connection to respective electrical connectors attached to respective electrical data buses. The electrical connectors include a data interface circuit for communication with the electrical bus, an optical transmitter and optical receiver electrically connected to the data interface circuit, and driver circuits for the optical transmitter and optical receivers. The driver circuits obtain power from the power line on the local electrical data bus. An optic fiber is connected between the optical transmitters and receivers at respective first and second electrical connectors to transfer data optically between the first and second electrical connectors and thereby extend the range of the data bus.

12 Claims, 3 Drawing Sheets

SELF POWERED DATA COMMUNICATION OPTICAL FIBER CABLE EXTENDER

BACKGROUND OF THE INVENTION

1. Field of the Invention

This invention relates to the field of data communications, and in particular to an extender for data cables.

2. Description of Related Art

Traditionally, computer peripherals, such as printers, scanners and the like, have been connected to the computer by serial or parallel cables. More recently, in 1995, the Universal Serial Bus has been developed as a substitute for the traditional method. The USB defines an expansion bus, which makes adding peripherals to a computer system as easy as hooking up a telephone to a wall jack. This was achieved through the use of PC host controller hardware and software, robust connectors and cable assemblies, peripheral friendly master-slave protocols, and expandable multi-port hubs.

As part of on-going improvement efforts in this area, a higher bandwidth version of the USB bus, known as USB 2.0 is being developed by a team from Compaq, Hewlett Packard, Intel and others. USB 2.0 is backward compatible with existing USB systems and offers speeds potentially as high as 480 Mbs.

The problem with existing cabling, however, is that it is limited to distances of about five meters when the bandwidth reaches hundreds of megabits per second.

An object of the invention is to extend the range of existing USB cabling.

SUMMARY OF THE INVENTION

According to the present invention an extender for an electrical data bus including a power line, comprising first and second electrical connectors for connection to respective electrical connectors attached to respective electrical data buses, each of said fist and second electrical connectors comprising a data interface circuit for communication with a respective said electrical bus, an optical transmitter and optical receiver electrically connected to said data interface circuit, driver circuits for said optical transmitter and optical receivers, said driver circuits obtaining power from the power line on the local electrical data bus, and a optic fiber connected between said optical transmitters and receivers at respective first and second electrical connectors to transfer data optically between said first and second electrical connectors.

The data bus is preferably a universal serial bus (USB), preferably a high bandwidth USB 2.0 bus with speeds up to 480 Mbs or higher.

The fiber optic cable is preferably plastic optic fiber cable. The transmitters and receivers are preferably of the type described in our co-pending application serial number GB 0011065.0, the contents or which are herein incorporated by reference.

The components at each end of the optical fiber are preferably all integrated into a unitary plastic connector housing, which interfaces directly with the electrical connector on the bus. This is preferably of the type that makes a snap fit with the electrical connector attached to the bus.

Although relying on optical components, the extender is self-powered since the power for the driver circuits is derived from the power line on the bus.

The invention also provides a method of extending the range of an electrical data, bus including a power line and signal lines, comprising connecting first and second electrical connectors to respective electrical connectors attached to respective electrical data buses, each of said first and second electrical connectors comprising a data interface circuit communicating with a respective said electrical bus, an optical transmitter and optical receiver electrically connected to said data interface circuit, driver circuits for said optical transmitter and optical receivers; deriving power for said driver circuits power from the power line on the local electrical data bus; and transferring data between said optical transmitter and receivers at said respective first and second connectors over an optic fiber.

The invention further provides an electrical data bus including a power line, comprising a first electrical connector for connection to an electrical connector attached to an electrical data bus and a second optical connector for connection to an optic fiber, said first electrical connector comprising a data interface circuit for communication with a respective said electrical bus, an optical transmitter and optical receiver electrically connected to said data interface circuit, driver circuits for said optical transmitter and optical receivers, said driver circuits obtaining power from the power line on the local electrical data bus, and a optic fiber connected between said optical transmitters and receivers and said second optical connector.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
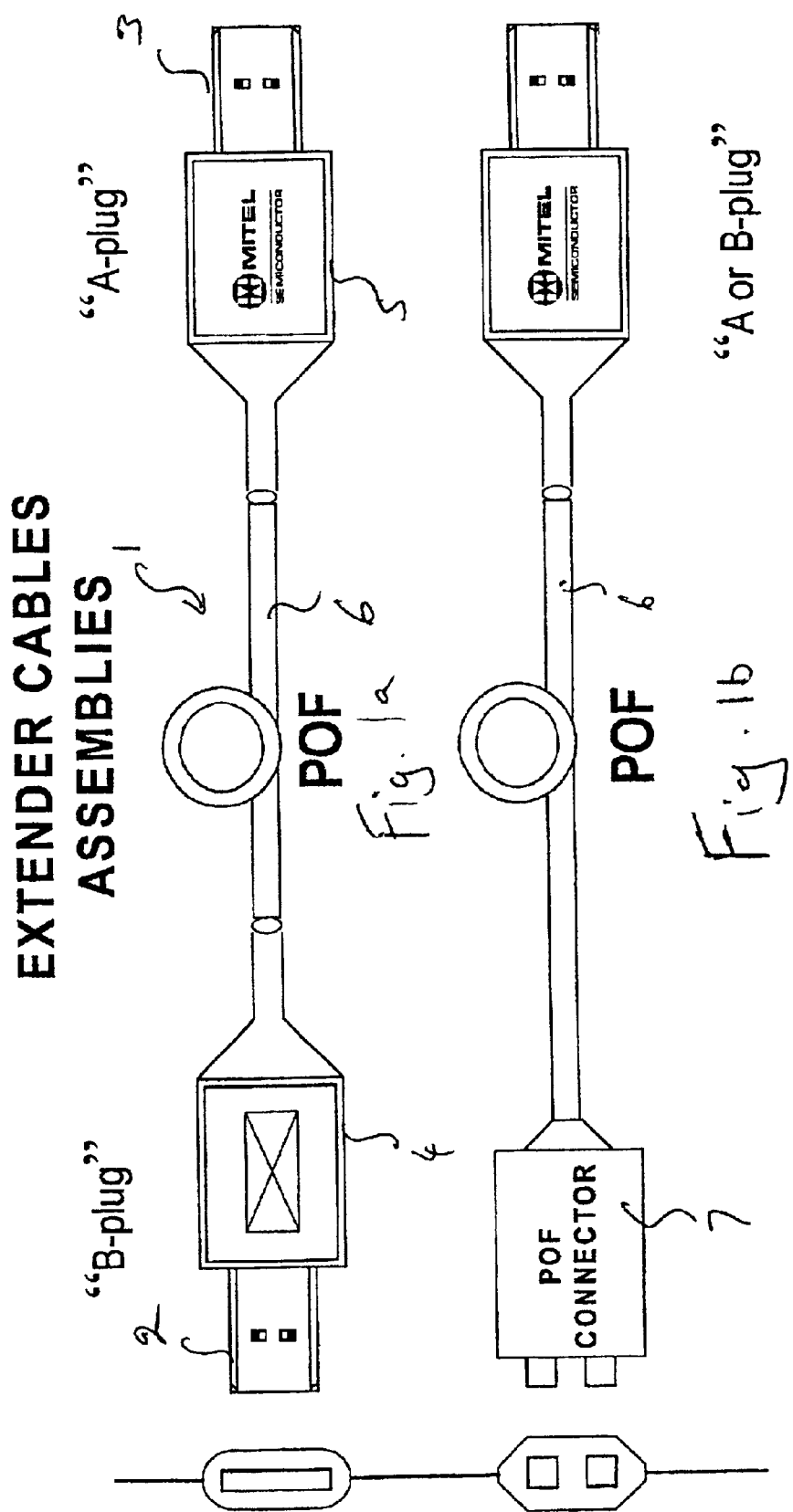
FIG. 1a and 1b showing bus extenders in accordance with the principles of the invention.

In FIG. 1a, an extender 1 is connected between electrical connectors 2, 3 terminating a serial data bus, preferably a Universal Serial Bus, particularly a USB 2.0 running at speeds of up to 480 Mbs.

The extender comprises a pair of plastic connector housings 4, 5 connected to respective bus connectors 2, 3. The connector housings 4, 5 are interconnected by a plastic optical fiber cable 6.

In an alternative embodiment, shown in FIG. 1b, the fiber optic cable can be terminated at one end by a fiber connector 7 for connection to another fiber optic cable.

Figure 2:
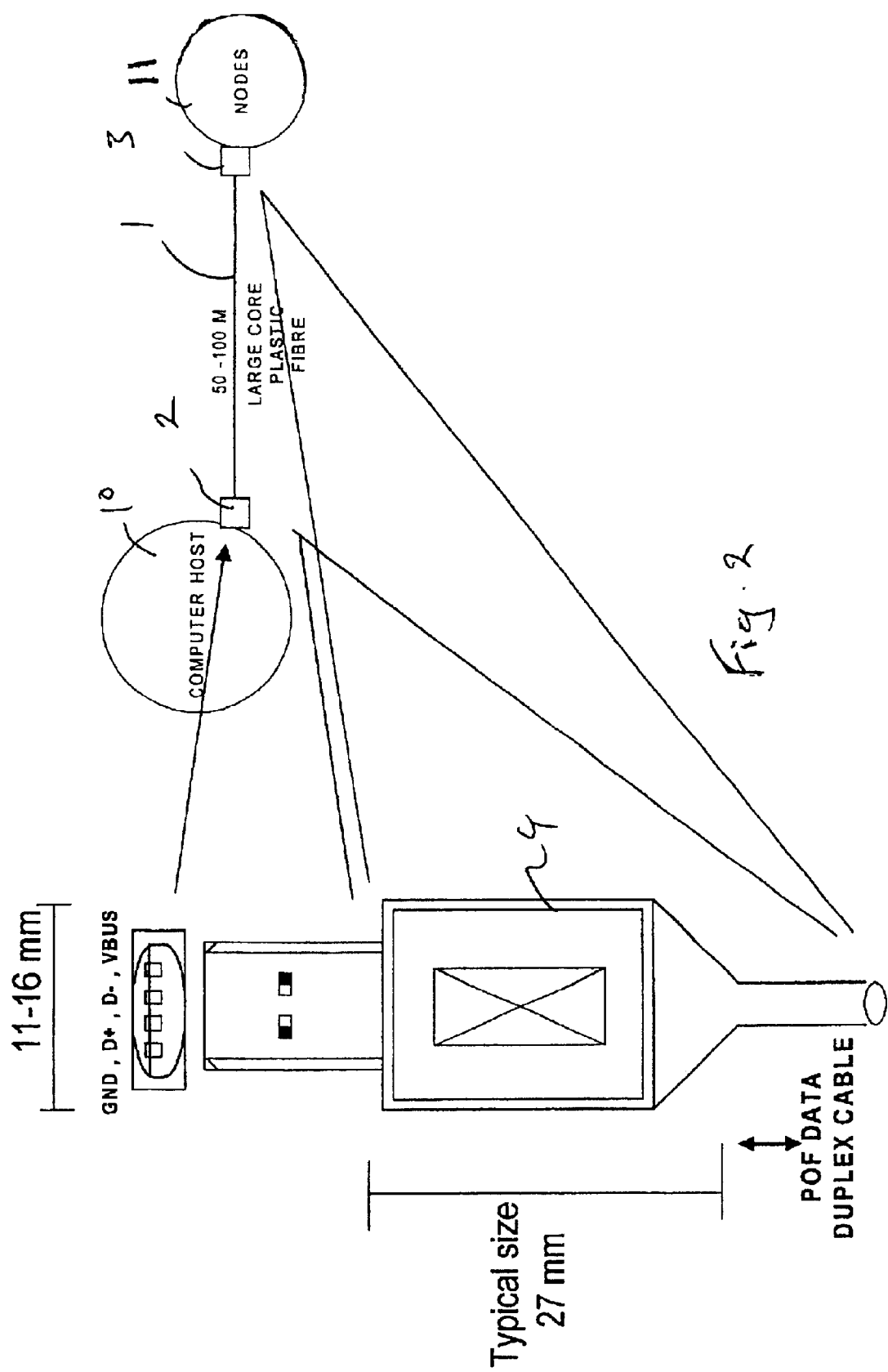
FIG. 2 is a diagram showing the use of an extender in a computer system.

In FIG. 2, the extender 1 is connected between electrical connectors 2, 9 at nodes 10, 11. It will be understood that the electrical connectors can be the terminations of existing USB cables or USB ports on a computer or peripheral.

Figure 3:
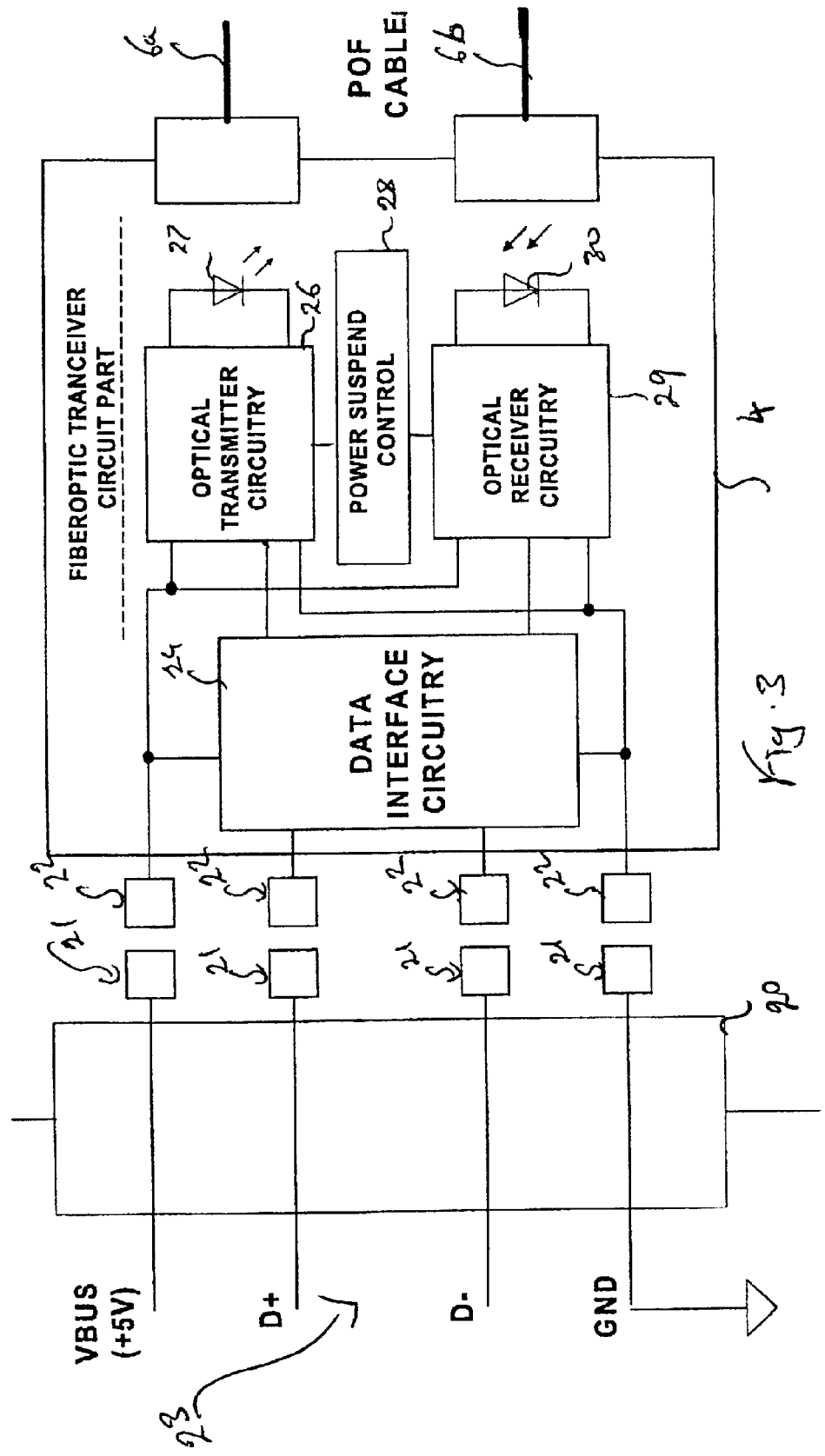
FIG. 3 is a block diagram of the extender circuitry.

As shown in FIG. 3, the USB bus comprises four lines, namely two signal lines $D^+$ and $D^-$, a ground, an a +5 V power line. These are terminated by an electrical connector 20 having electrical terminals. The electrical connector 20 is of conventional type.

The connector housing 4 is made of plastic and snaps together with the electrical connector 20 so that terminals 21 mate with corresponding terminals 22 of connector 20. The terminals 22 are connected to the data interface circuitry 24, which extracts the signals from the USB bus 23 in the forward direction and passes them to optical transmitter circuitry, which acts as a driver for laser diode o27, which directs light pulses into outgoing optic fiber 6a.

Power is supplied to the data interface circuitry 24 and the transmitter circuitry 26 by the +5V power line on the USB 23.

Incoming light pulses from optic fiber 6b are passed to receiver 30, for example, a PIN diode, where they are directed to the optical receiver circuitry 29, which acts as the driver for the receiver 30. The circuitry 29 is also powered by power from the power line of the data bus 23.

The present invention thus provides a self-contained extender that is especially suitable for a high speed serial bus, such as USB 2.0. Since it draws power directly from the bus and uses fiber optics for communication, it is able to provide an effective, yet simple, way of extending the range of a conventional bus. The electronics are contained within the plastic connector and the electrical-optical interfaces are transparent to the user, who merely plugs each end of the extender into a conventional USB connector or port.

What is claimed is:

1. An extender for an electrical data bus including a power line and signal lines, comprising first and second electrical connectors for connection to respective electrical connectors attached to respective electrical data buses, each of said first and second electrical connectors comprising a data interface circuit for communication with a respective said electrical bus, an optical transmitter and optical receiver electrically connected to said data interface circuit, driver circuits for said optical transmitters and optical receivers, said driver circuits obtaining power from the power line on the local electrical data bus, and an optic fiber connected between said optical transmitters and receivers at respective first and second electrical connectors to transfer data optically between said first and second electrical connectors.

2. An extender as claimed in claim 1, wherein said data interface circuit, said driver circuit and said optical transmitter and receiver at each end of said optical fiber are integrated into a respective connector housing.

3. An extender as claimed in claim 2, wherein said housing is made of plastic.

4. An extender as claimed in claim 3, wherein said housing makes a snap fit with the electrical connector.

5. An extender as claimed in claim 4, wherein said fiber is large core plastic fiber.

6. An extender as claimed in claim 1, wherein said electrical bus is a Universal Serial Bus.

7. A method of extending the range of an electrical data bus including a power line and signal lines, comprising connecting first and second electrical connectors to respective electrical connectors attached to respective electrical data buses, each of said first and second electrical connectors comprising a data interface circuit communicating with a respective said electrical bus, an optical transmitter and optical receiver electrically connected to said data interface circuit, driver circuits for said optical transmitters and optical receivers; deriving power for said driver circuits power from the power line on the local electrical data bus; and transferring data between said optical transmiters and receivers at said respective first and second connectors over an optic fiber.

8. A method as claimed in claim 7, wherein said data interface circuit, said driver circuit and said optical transmitter and receiver at each end of said optical fiber are integrated into a respective connector housing, and said connected housing is snapped onto the respective electrical connector attached to the local bus.

9. A method as claimed in claim 7, wherein said electrical bus is a Universal Serial Bus.

10. An electrical data bus including a power line, comprising a first electrical connector for connection to an electrical connector attached to an electrical data bus and a second optical connector for connection to an optic fiber, said first electrical connector comprising a data interface circuit for communication with a respective said electrical bus, an optical transmitter and optical receiver electrically connected to said data interface circuit, driver circuits for said optical transmitters and optical receivers, said driver circuits obtaining power from the power line on the local electrical data bus, and an optic fiber connected between said optical transmitters and receivers and said second optical connector.

11. An extender as claimed in claim 10, wherein said data interface circuit, said driver circuit and said optical transmitter and receiver at each end of said optical fiber are integrated into a respective connector housing.

12. An extender as claimed in claim 11, wherein said housing is made of plastic.

* * * * *